(12) United States Patent
Kachmar

(10) Patent No.: US 8,625,946 B2
(45) Date of Patent: Jan. 7, 2014

(54) OPTICAL FIBER ASSEMBLY

(75) Inventor: Wayne M. Kachmar, North Bennington, VT (US)

(73) Assignee: ADC Telecommunications, Inc., Berwyn, PA (US)

( * ) Notice: Subject to any disclaimer, the term of this patent is extended or adjusted under 35 U.S.C. 154(b) by 162 days.

(21) Appl. No.: 13/044,075

(22) Filed: Mar. 9, 2011

(65) Prior Publication Data

US 2011/0222825 A1    Sep. 15, 2011

Related U.S. Application Data

(60) Provisional application No. 61/312,731, filed on Mar. 11, 2010.

(51) Int. Cl.
*G02B 6/44*    (2006.01)
(52) U.S. Cl.
USPC .......................................................... 385/110
(58) Field of Classification Search
None
See application file for complete search history.

(56) References Cited

U.S. PATENT DOCUMENTS

| | | | | |
|---|---|---|---|---|
| 4,596,443 | A * | 6/1986 | Diemeer et al. | 385/110 |
| 6,160,940 | A * | 12/2000 | Summers et al. | 385/110 |
| 6,477,304 | B2 * | 11/2002 | Dallas et al. | 385/110 |
| 7,498,518 | B2 | 3/2009 | Kenny et al. | |
| 2004/0149483 | A1 | 8/2004 | Glew | |
| 2006/0113106 | A1 | 6/2006 | Vexler et al. | |
| 2008/0292254 | A1 | 11/2008 | Kachmar | |
| 2009/0297104 | A1 | 12/2009 | Kachmar | |
| 2009/0317038 | A1 | 12/2009 | Kachmar | |
| 2009/0324180 | A1 | 12/2009 | Kachmar et al. | |
| 2009/0324182 | A1 | 12/2009 | Kachmar et al. | |

* cited by examiner

*Primary Examiner* — Sarah Hahm
(74) *Attorney, Agent, or Firm* — Merchant & Gould P.C.

(57) ABSTRACT

An optical fiber assembly includes a core. The core includes a central portion and a plurality of fins that extends radially outward from the central portion. The central portion defines a central passage. The central portion and the plurality of fins cooperatively define a plurality of grooves that is helically oriented along a length of the core. A plurality of optical fibers is disposed in the plurality of grooves. A strength member is disposed in the central passage of the core. An outer covering surrounds the core. The outer covering is air permeable.

18 Claims, 9 Drawing Sheets

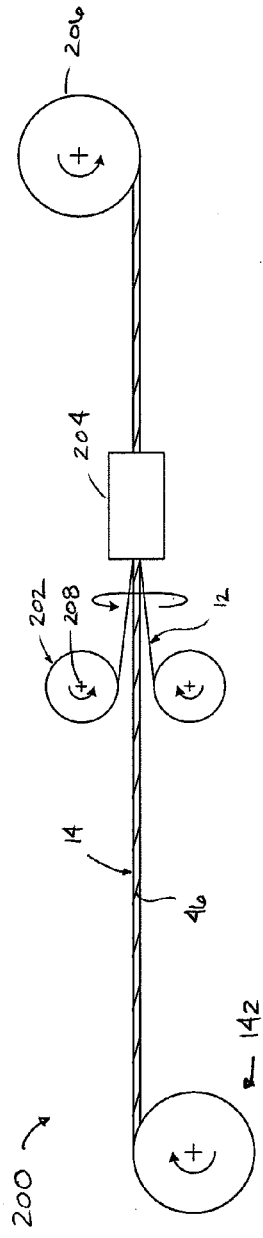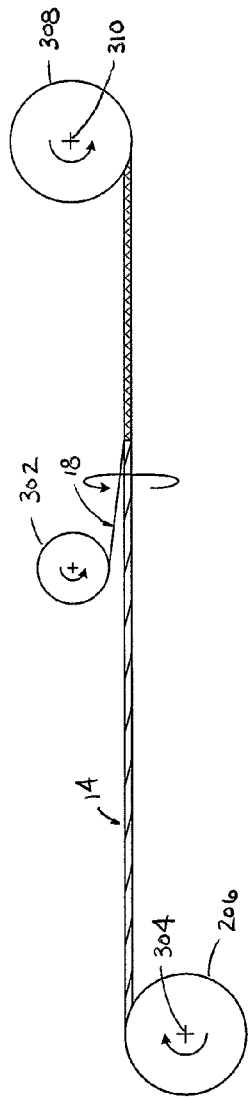
FIG. 9
FIG. 10

OPTICAL FIBER ASSEMBLY

CROSS-REFERENCE TO RELATED APPLICATION

The present application claims the benefit of U.S. Provisional Patent Application Ser. No. 61/312,731, filed Mar. 11, 2010, which application is hereby incorporated by reference in its entirety.

SUMMARY

An aspect of the present disclosure relates to an optical fiber assembly. The optical fiber assembly includes a core defining a plurality of grooves that is helically oriented along a length of the core. A plurality of optical fibers is disposed in the plurality of grooves. An outer covering surrounds the core. The outer covering defines a plurality of pores.

Another aspect of the present disclosure relates to an optical fiber assembly. The optical fiber assembly includes a core. The core includes a central portion and a plurality of fins that extends radially outward from the central portion. The central portion defines a central passage. The central portion and the plurality of fins cooperatively define a plurality of grooves that is helically oriented along a length of the core. A plurality of optical fibers is disposed in the plurality of grooves. A strength member is disposed in the central passage of the core. An outer covering surrounds the core. The outer covering is air permeable.

Another aspect of the present disclosure relates to a method of manufacturing a core of an optical fiber assembly. The method includes rotating a strength member about a longitudinal axis of the strength member. The strength member is fed into a crosshead. The crosshead includes a stationary die that is adapted for forming a core about the strength member. Material is extruded through the stationary die about the strength member.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 9 is a schematic representation of a secondary operation for assembling the core and optical fiber.

FIG. 10 is a schematic representation of a tertiary operation for assembling the outer covering to the core.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
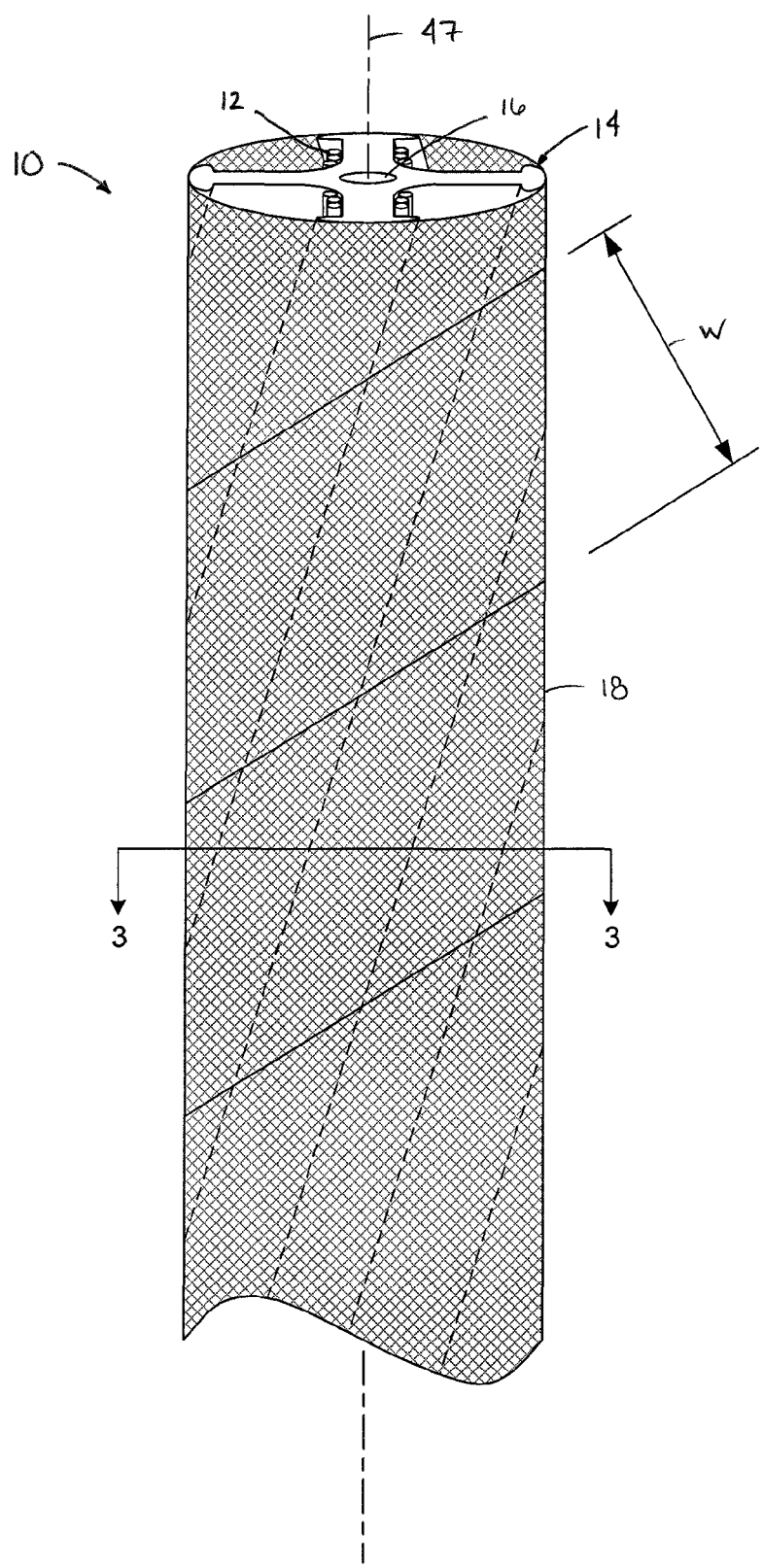
FIG. 1 is a perspective view of an optical fiber assembly having exemplary features of aspects in accordance with the principles of the present disclosure.

Referring now to FIG. 1, an optical fiber assembly 10 is shown. The optical fiber assembly 10 includes at least one optical fiber 12, a core 14, a strength member 16 and an outer covering 18.

The optical fiber assembly 10 is suitable for use in a security device that is adapted to sense contaminants in the air. In one embodiment, the contaminants collect on the optical fiber 12 of the optical fiber assembly 10 of the security device. Light passing through the optical fiber 12 of the optical fiber assembly 10 is reflected off the contaminants. The reflected light can be analyzed to determine the type of contaminant.

In the depicted embodiment, the fiber optic cable assembly 10 includes a plurality of optical fibers 12. In one embodiment, the fiber optic cable assembly 10 includes twelve optical fibers 12. In another embodiment, the fiber optic cable assembly 10 includes at least twelve optical fibers 12.

Figure 2:
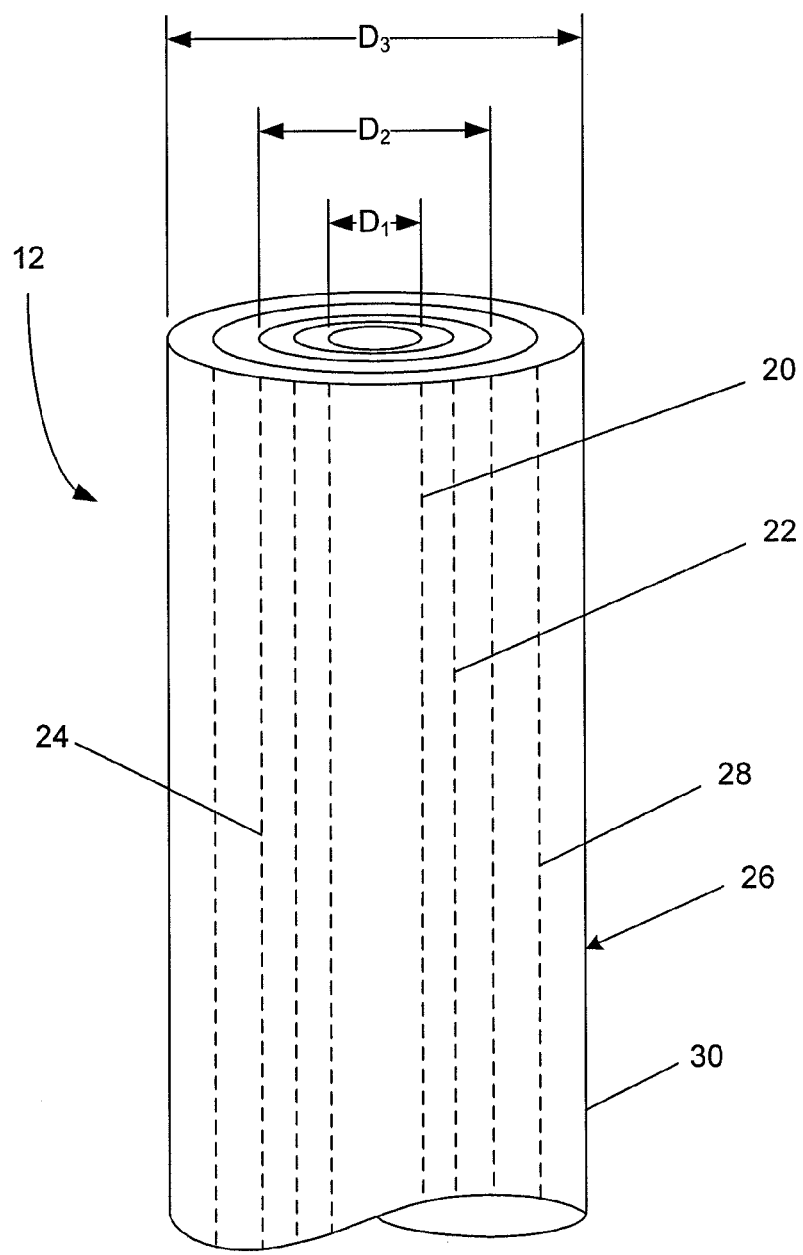
FIG. 2 is a perspective view of an optical fiber suitable for use with the optical fiber assembly of FIG. 1.

Referring now to FIG. 2, the optical fiber 12 is shown. The optical fiber 12 can have any number of configurations. In the depicted embodiment of FIG. 2, the optical fiber 12 includes a core 20. The core 20 is made of a glass material, such as a silica-based material, having an index of refraction. In the subject embodiment, the core 20 has an outer diameter $D_1$ of less than or equal to about 10 μm.

The core 20 of each optical fiber 12 is surrounded by a first cladding layer 22 that is also made of a glass material, such as a silica based-material. The first cladding layer 22 has an index of refraction that is less than the index of refraction of the core 20. This difference between the index of refraction of the first cladding layer 22 and the index of refraction of the core 20 allows an optical signal that is transmitted through the optical fiber 12 to be confined to the core 20.

A second cladding layer 24 surrounds the first cladding layer 22. The second cladding layer 24 has an index of refraction. In the subject embodiment, the index of refraction of the second cladding layer 24 is about equal to the index of refraction of the first cladding layer 22. The second cladding layer 24 is immediately adjacent to the first cladding layer 22. In the subject embodiment, the second cladding layer 24 has an outer diameter $D_2$ of less than or equal to 125 μm.

A coating, generally designated 26, surrounds the second cladding layer 24. The coating 26 includes an inner layer 28 and an outer layer 30. In the subject embodiment, the inner layer 28 of the coating 26 is immediately adjacent to the second cladding layer 24 such that the inner layer 28 surrounds the second cladding layer 24. The inner layer 28 is a polymeric material (e.g., polyvinyl chloride, polyethylenes, polyurethanes, polypropylenes, polyvinylidene fluorides, ethylene vinyl acetate, nylon, polyester, or other materials) having a low modulus of elasticity. The low modulus of elasticity of the inner layer 28 functions to protect the optical fiber 12 from microbending.

The outer layer 30 of the coating 26 is a polymeric material having a higher modulus of elasticity than the inner layer 28. In the subject embodiment, the outer layer 30 of the coating 26 is immediately adjacent to the inner layer 28 such that the outer layer 30 surrounds the inner layer 28. The higher modulus of elasticity of the outer layer 30 functions to mechanically protect and retain the shape of optical fiber 12 during handling. In the subject embodiment, the outer layer 30 defines an outer diameter $D_3$ of less than or equal to 300 µm. In another embodiment, the outer diameter $D_3$ of the outer layer 30 is less than or equal to 250 µm. In another embodiment, the outer diameter $D_3$ of the outer layer 30 is less than or equal to 200 µm.

Figure 3:
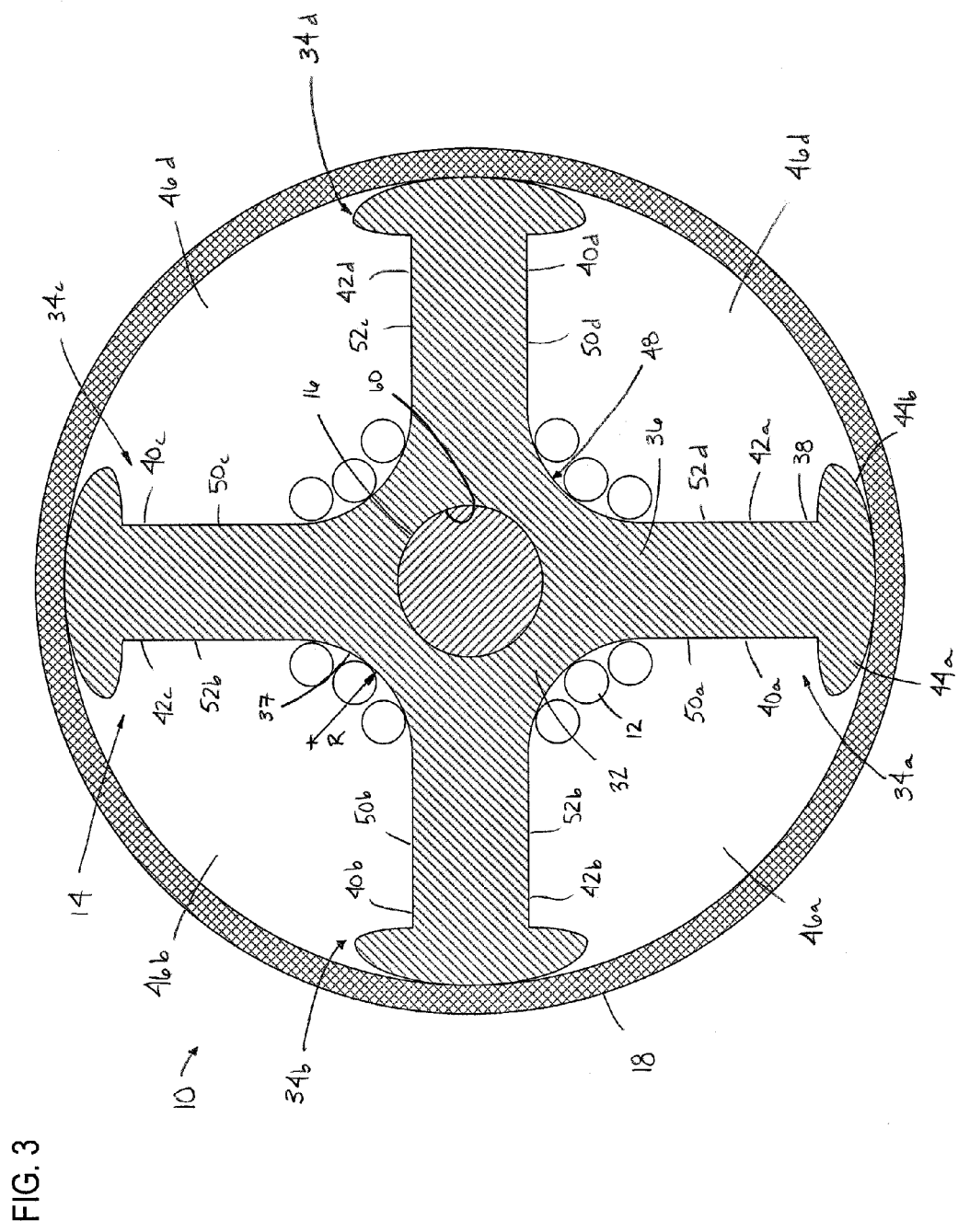
FIG. 3 is a cross-sectional view of the optical fiber assembly taken on line 3-3 of FIG. 1.
Figure 4:
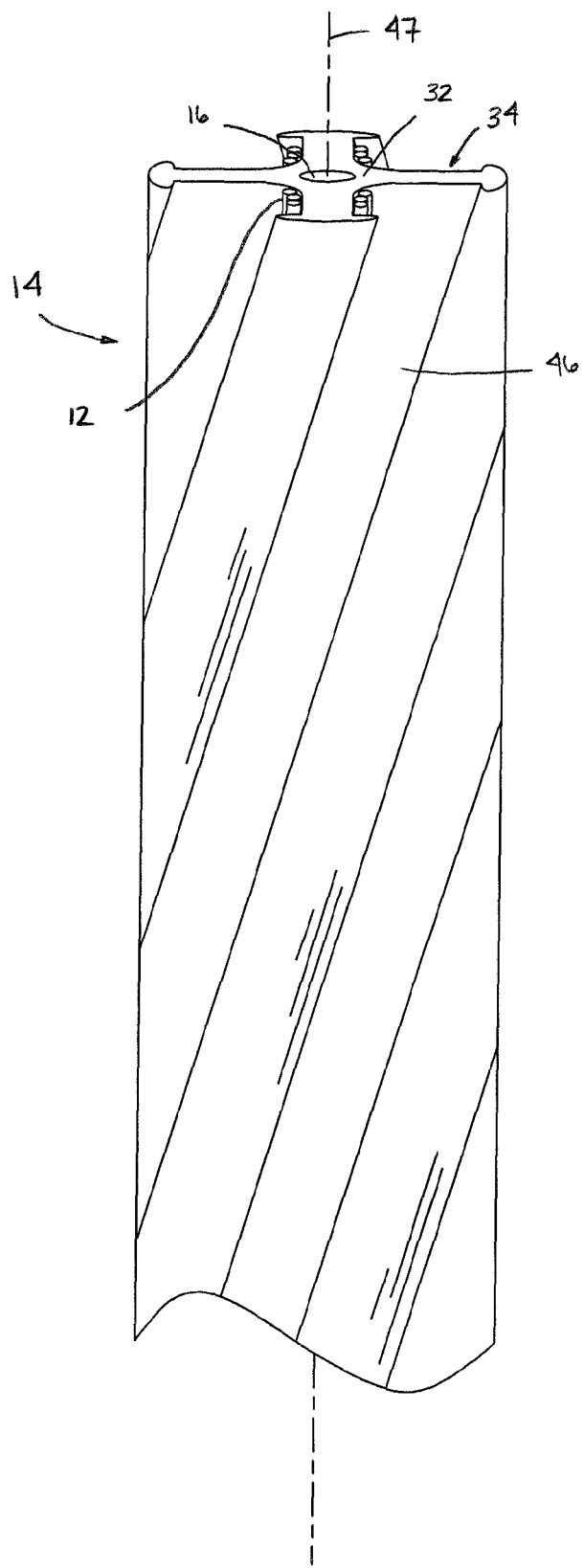
FIG. 4 is a perspective view of a core suitable for use in the optical fiber assembly of FIG. 1.

Referring now to FIGS. 3 and 4, the core 14 of the optical fiber assembly 10 will be described. The core 14 includes a central portion 32 and a plurality of fins 34. The fins 34 extend radially outward from the central portion 32. In the depicted embodiment, the core 14 includes four fins 34. The core 14 of the depicted embodiment includes a first fin 34a, a second fin 34b, a third fin 34c and a fourth fin 34d. Each of the fins 34 is symmetrically disposed about the central portion 32 of the core 14. In the depicted embodiment, each of the fins 34 is disposed 90 degrees from the immediately adjacent fins 34.

Each of the fins 34 includes a base end 36 and an oppositely disposed free end 38. The base end 36 is connected to the central portion 32 of the core 14. In the depicted embodiment, the base end 36 and the central portion 32 are monolithic (i.e., an integral connection without a seam, joint, weld, etc.).

In the depicted embodiment, the base end 36 of each of the fins 34 is joined to the central portion 32 of the core 14 by a fillet 37. The fillet 37 has a radius R.

Each of the fins 34 includes a first surface 40 and an oppositely disposed second surface 42. Each of the first and second surfaces 40, 42 extends between the base and free ends 36, 38 of the fin 34.

In the depicted embodiment, the free end 38 includes a first projection 44a that extends outwardly from the first surface 40 of the fin 34 in a direction that is generally perpendicular to the fin 34. The free end 38 further includes a second projection 44b that extends outwardly from the second surface 42 of the fin 34 in a direction that is generally perpendicular to the fin 34.

The core 14 defines a plurality of grooves 46. The plurality of grooves 46 is adapted to receive the plurality of optical fibers 12. The plurality of grooves 46 is symmetrically disposed about the central portion 32 of the core 14 so that the distance between adjacent grooves 46 is generally constant along the length of the optical fiber assembly 10. In the depicted embodiment, the plurality of grooves 46 of the core 14 is helically disposed about a central longitudinal axis 47 of the optical fiber assembly 10 so that the plurality of grooves 46 spirals about the central longitudinal axis 47 of the optical fiber assembly 10. The helical configuration of the grooves 46 reduces the risk of damage to the optical fibers 12 caused by tensile and compressive forces acting on the optical fibers 12 as a result of the optical fiber assembly 10 being coiled or spooled about a cable spool.

In the depicted embodiment, the core 14 defines four grooves 46. The core 14 defines a first groove 46a, a second groove 46b, a third groove 46c and a fourth groove 46d. The first groove 46a is disposed between the first and second fins 34a, 34b. The second groove 46b is disposed between the second and third fins 34b, 34c. The third groove 46c is disposed between the third and fourth fins 34c, 34d while the fourth groove 46d is disposed between the fourth and first fins 34d, 34a.

Each of the grooves 46 includes a base wall 48, a first sidewall 50 and a second sidewall 52. In the depicted embodiment, the first surface 40a of the first fin 34a is a first sidewall 50a of the first groove 46a while a second surface 42b of the second fin 34b is the second sidewall 52a of the first groove 46a. The first surface 40b of the second fin 34b is a first sidewall 50b of the second groove 46b while a second surface 42c of the third fin 34c is a second sidewall 52b of the second groove 46b. The first surface 40c of the third fin 34c is a first sidewall 50c of the third groove 46c while a second surface 42d of the fourth fin 34d is a second sidewall 52c of the third groove 46c. The first surface 40d of the fourth fin 34d is a first sidewall 50d of the fourth groove 46d while a second surface 42a of the first fin 34a is a second sidewall 52d of the fourth groove 46d.

The base wall 48 of the groove 46 is arcuate in shape so that the base wall 48 is generally concave. In the depicted embodiment, the base wall 48 is formed by the fillets 37 of the adjacent fins 34.

Figure 5:
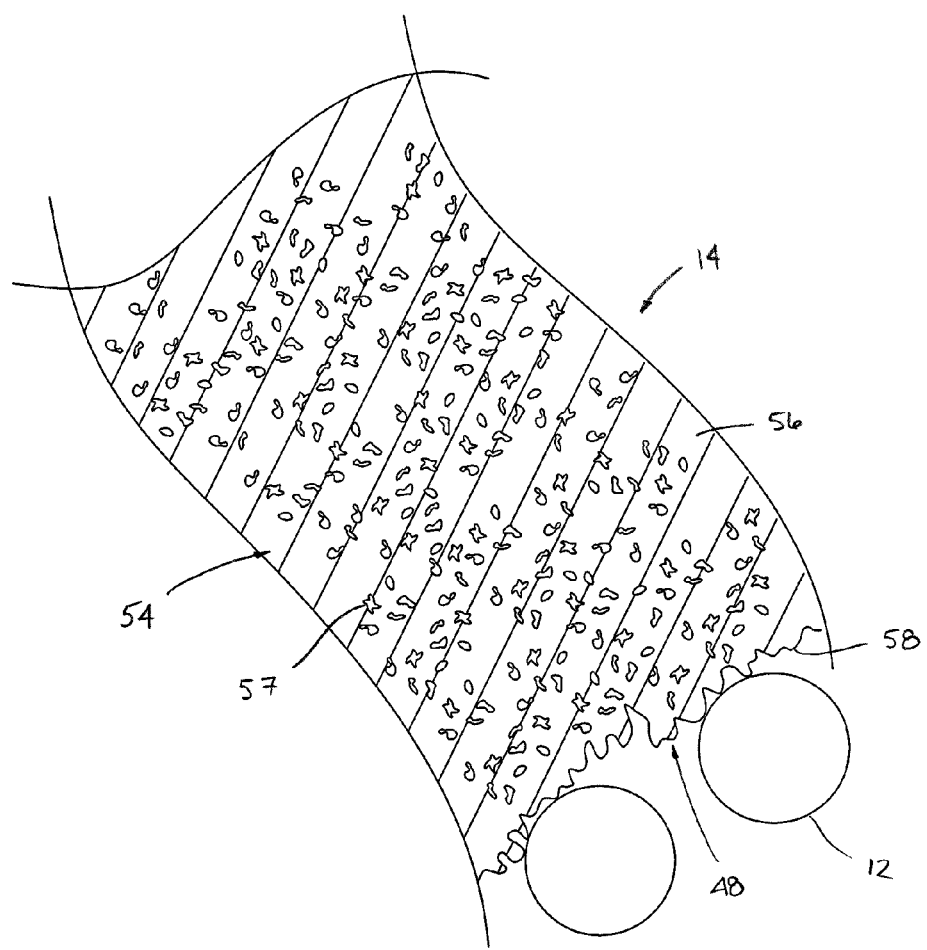
FIG. 5 is a fragmentary view of the core of FIG. 4.

Referring now to FIG. 5, the core 14 includes a material 54. The material 54 includes a foam 56. In the subject embodiment, the foam 56 is closed cell foam. In one embodiment, the foam 56 is formed using a chemical foaming agent. An exemplary chemical foaming agent is suitable for use with the core 14 of the optical fiber assembly 10 is sold under the brand name EXPANCEL® by Akzo Nobel N.V.

The chemical foaming agent facilitates the formation of air bubbles 57 in the foam 56. In one embodiment, the percentage of air bubble formation in the foam 56 is about 5% to about 50%. In another embodiment, the percentage of air bubble formation in the foam 56 is about 10% to about 50%. In another embodiment, the percentage of air bubble formation in the foam 56 is about 15% to about 50%. In another embodiment, the percentage of air bubble formation in the foam 56 is about 20% to about 50%. In another embodiment, the percentage of air bubble formation in the foam 56 is about 25% to about 50%.

The foaming agent is added to the material 54 of the core 14 to form an exterior surface 58 of the core 14 that is uneven or nonuniform. The optical fibers 12 are disposed against the exterior surface 58. In the depicted embodiment, the uneven exterior surface 58 is the bottom wall 48 of the groove 46. The uneven exterior surface 58 increases the surface area of the optical fiber 12 that is in direct contact with the surrounding atmosphere.

Referring now to FIG. 3, the central portion 32 of the core 14 defines a central passage 60. The central passage 60 is adapted to receive the strength member 16.

In the depicted embodiment, the central passage 60 is centrally disposed in the central portion 32 of the core 14. The central passage 60 extends the length of the core 14 along the central longitudinal axis 47 of the optical fiber cable assembly 10. In one embodiment, the core 14 is bonded to the strength member 16.

In one embodiment, the strength member 16 can have a glass reinforced polymer (GRP) construction. The glass reinforced polymer can include a polymer base material reinforced by a plurality of glass fibers such as E-glass, S-glass or other types of glass fiber.

Figure 6:
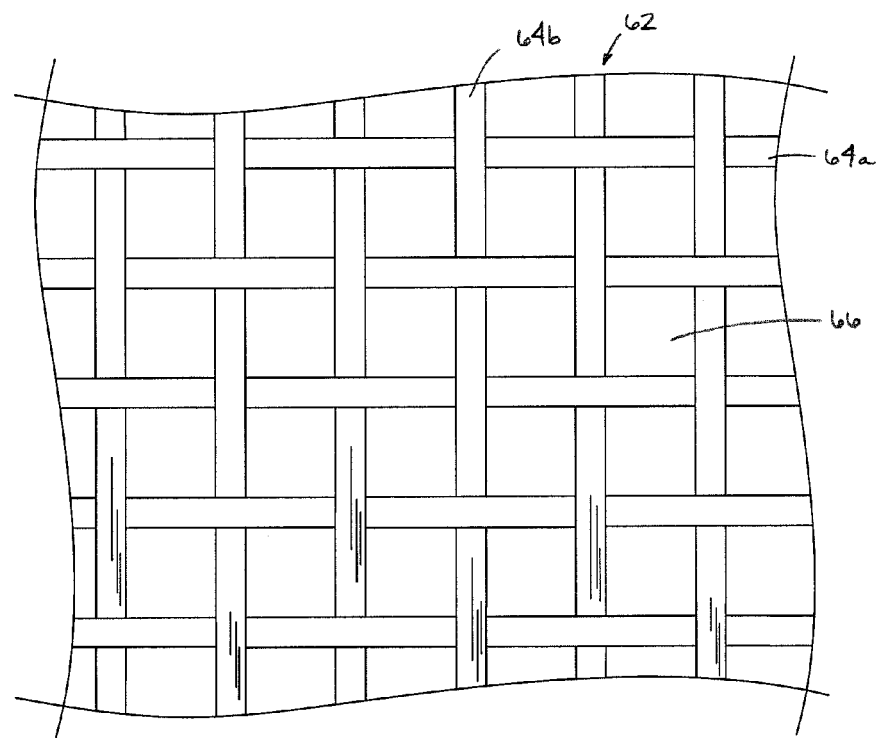
FIG. 6 is a fragmentary view of a material suitable for use in an outer covering of the optical fiber assembly of FIG. 1.

Referring now to FIGS. 1, 3 and 6, the outer covering 18 will be described. The outer covering 18 immediately surrounds the core 14. In one embodiment, the outer covering 18 circumferentially surrounds at least a portion of the core 14 of the optical fiber assembly 10. In another embodiment, the outer covering 18 circumferentially surrounds the core 14 along the length of the optical fiber assembly 10. In the depicted embodiment, the outer covering 18 is helically wrapped around the core 14.

The outer covering 18 includes a mesh material 62 that is permeable to air. The mesh material 62 of the outer covering 18 has a porosity that allows air and contaminants in that air to pass through the outer covering 18 and surround the optical fibers 12.

In one embodiment, the mesh material 62 is a thin strip of material having a width W. The mesh material 62 is helically wrapped about the core 14. In one embodiment, the width W is less than or equal to about 2 inches. In another embodiment, the width W is less than or equal to about 1.5 inches. In another embodiment, the width W is less than or equal to about 1 inch.

In the depicted embodiment of FIG. 6, the mesh material 62 includes a first plurality of strands 64a and a second plurality of strands 64b. The first and second plurality of strands 64a, 64b are woven together to form the mesh material 62. In the depicted embodiment, the first plurality of strands 64a are oriented so that the first plurality of strands 64a extends in a direction that is about 90 degrees from the direction of the second plurality of strands 64b.

The first and second pluralities of strands 64a, 64b cooperatively define a plurality of pores 66 that extend through the mesh material 62. In the depicted embodiment, the pores 66 are generally square in shape. Air passes through the pores 66 of the optical fiber assembly 10 and enters the grooves 46 of the core 14.

In one embodiment, the first and second strands 64a, 64b of the mesh material 62 are made of a fiberglass material. In another embodiment, the first and second strands 64a, 64b are made of an aluminum material. In one embodiment, each of the first and second strands 64a, 64b has a generally circular cross-section with an outer diameter of less than or equal to about 0.015 inches. In another embodiment, the outer diameter of each of the first and second strands is less than or equal to about 0.013 inches.

Figure 7:
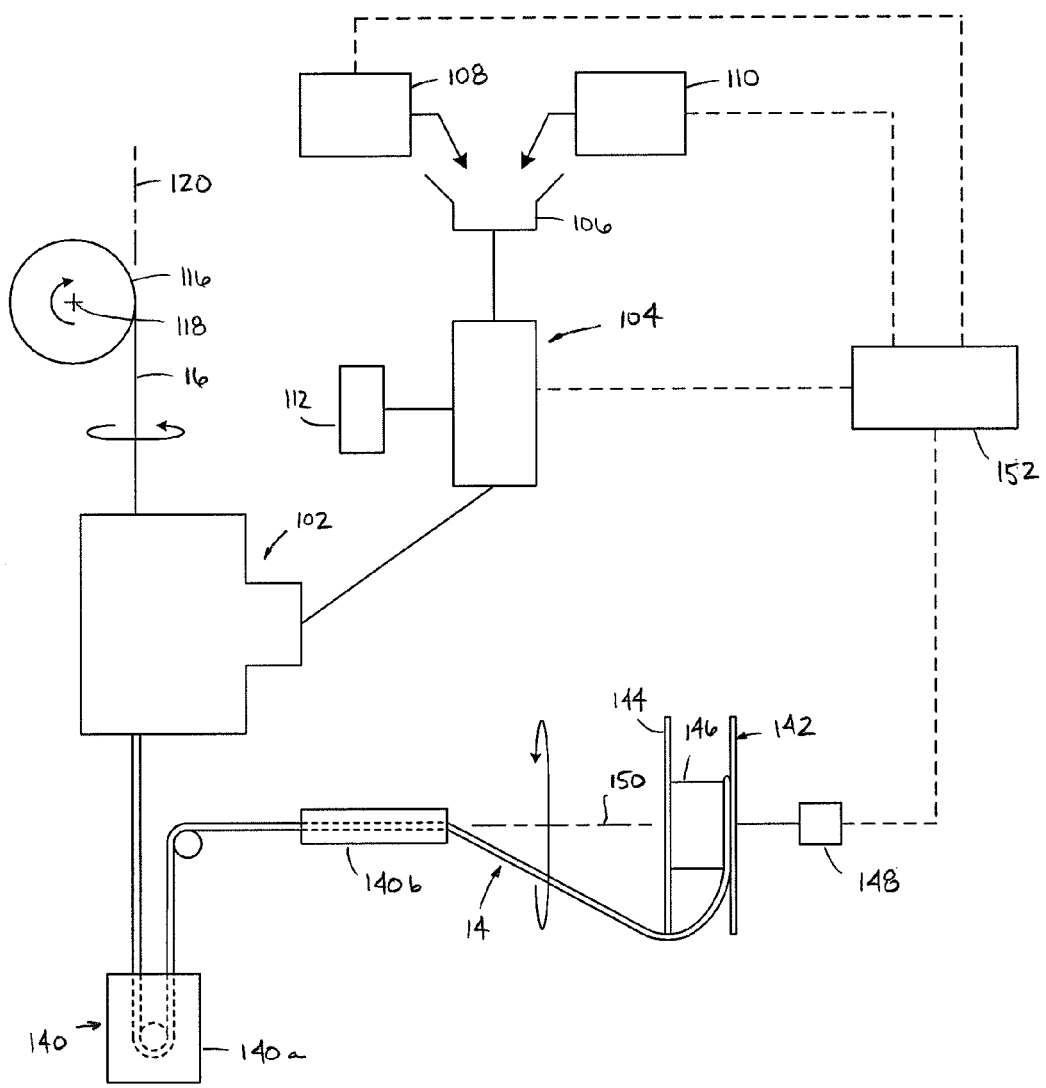
FIG. 7 is a schematic representation of a system for manufacturing the core of FIG. 4.

Referring now to FIG. 7, a schematic representation of a system 100 for manufacturing the core 14 is shown. The system 100 includes a crosshead, generally designated 102, that receives thermoplastic material from an extruder 104. A hopper 106 is used to feed materials into the extruder 104. A first conveyor 108 conveys the base material to the hopper 106. A second conveyor 110 conveys the chemical foaming agent to the hopper 106.

From the hopper 106, the base material and the chemical foaming agent move into the extruder 104. In one embodiment, the mixture moves by gravity into the extruder 104. In the extruder 104, the base material and the chemical foaming agent are mixed, masticated and heated. The base material and the chemical foaming agent are mixed and masticated in order to form the material 54 having a uniform distribution.

The extruder 104 is heated by a heating system 112 that may include one or more heating elements for heating zones of the extruder 104 as well as the crosshead 102 to desired processing temperatures. As the material 54 is heated, the chemical foaming agent facilitates the formation of the foam 56.

The extruder 104 also functions to convey the mixture to the crosshead 102. The extruder 104 provides pressure for forcing the material 54 through the crosshead 102.

The strength member 16 is fed into the crosshead 102 from a feed roll 116. The feed roll 116 is rotated about an axis 118 (shown as a "+" in FIG. 7) to pay out the strength member 16 from the feed roll 116. In the depicted embodiment, the strength member 16 is vertically fed into the crosshead 102. As the strength member 16 is fed into the crosshead 102, the feed roll 116 is rotated about a longitudinal axis 120 of the strength member 16. In the depicted embodiment, the feed roll 116 is rotated in a counterclockwise direction about the longitudinal axis 120 of the strength member 16. The rotation of the feed roll 116 about the longitudinal axis 120 causes the strength member 16 to rotate about the longitudinal axis 120 as the strength member 16 enters the extruder 104.

Figure 8:
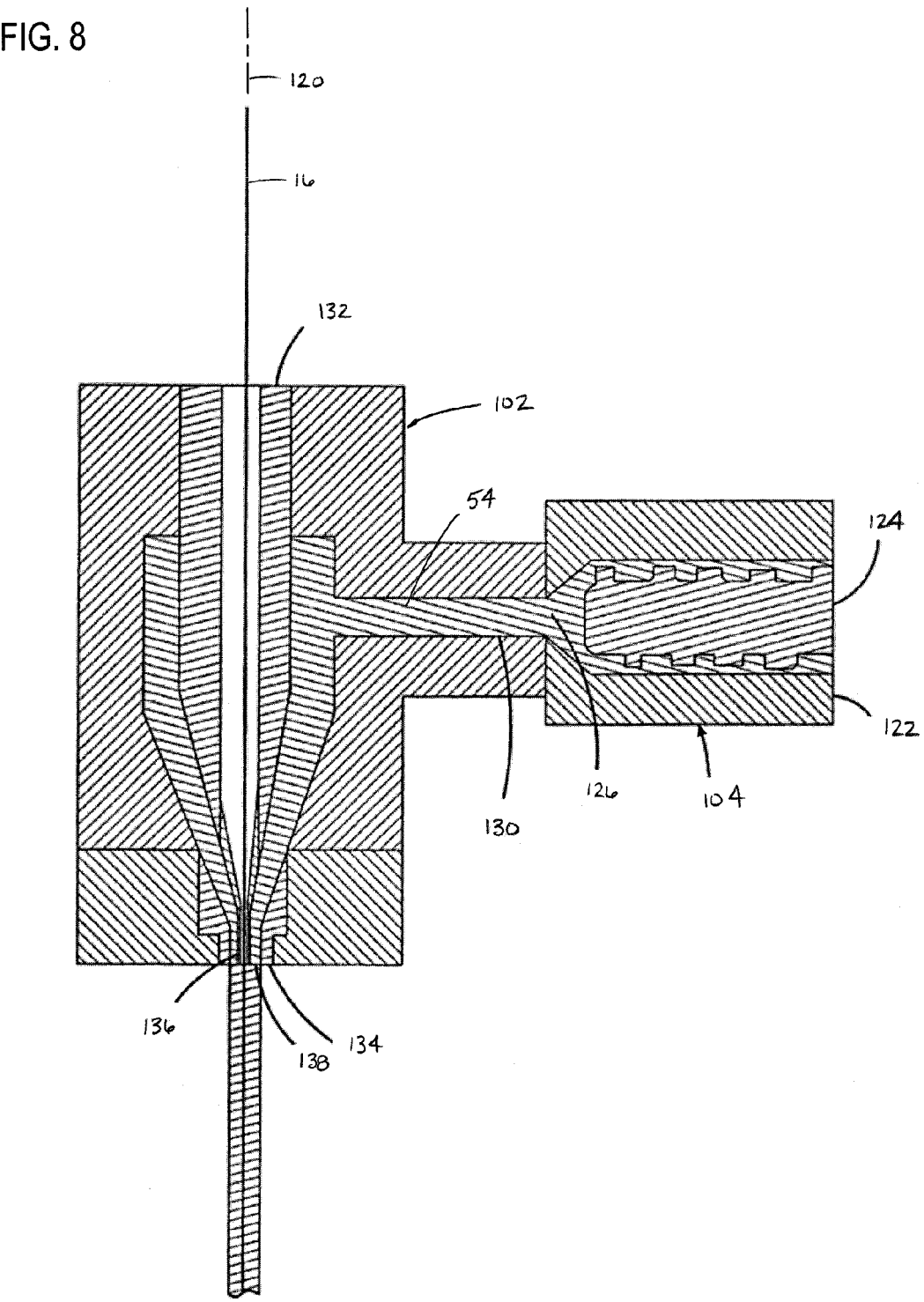
FIG. 8 is a schematic representation of a crosshead suitable for use with the system of FIG. 7.

Referring now to FIG. 8, a schematic representation of the extruder 104 is shown. The extruder 104 includes an extruder barrel 122 and an auger/style extruder screw 124 positioned within the extruder barrel 122. An extruder screen 126 can be provided at the exit end of the extruder 104. The screen 126 prevents pieces too large for extrusion from passing from the extruder 104 into the crosshead 102.

The crosshead 102 includes a material input location 130 that receives the material 54 from the extruder 104. The crosshead 102 also includes a tip 132 and a die 134.

The tip 132 defines an inner passageway 136. The strength member 16 is fed through the inner passageway 136 of the tip 132.

The die 134 is stationary in the crosshead 102. The die 134 defines an annular extrusion passage 138 that surrounds the exterior of the tip 132. The crosshead 102 defines an annular passageway for feeding the material 54 to the annular extrusion passage 138.

As the previously described, the strength member 16 rotates about the longitudinal axis 120 of the strength member 16 as the strength member 16 is fed into the crosshead 102. After the material 54 of the core 14 passes through the die 134 of the crosshead 102, the material 54 bonds to the strength member 16. As the strength member 16 is rotating in the crosshead 102 and as the die 134 is stationary within the crosshead 102, the spiral or helical pattern on the core 14 is formed.

After the fiber optic cable 10 is extruded from the crosshead 102, the core 14 is cooled and shape set at a water trough 140. In the depicted embodiment, there is a plurality of water troughs 140. The first water trough 140a is disposed closer to the crosshead 102 than the second water trough 140b. The temperature of the fluid in the first water trough 140a is greater than the temperature of the water in the second water trough 140b.

The cooled final product is stored on a take-up roll 142. In the depicted embodiment, the take-up roll 142 is oriented so that the core 14 passes over a flange 144 of the take-up roll 14 to coil around a spooling portion 146 of the take-up roll 142. In one embodiment, the take-up roll 142 is stationary. The rotation of the core 14 about the longitudinal axis 120 of the strength member 16 causes the core 14 to coil around the spooling portion 146 of the take-up roll 142.

In another embodiment, the take-up roll 142 is rotated by a drive mechanism 148. In one embodiment, the speed at which the drive mechanism 148 rotates the take-up roll 142 about an axis 150 of the take-up roll 142 is variable. The rotation of the take-up roll 142 may prevent twisting of the core 14 as more layers are coiled around the spooling portion 142. A controller 152 coordinates the operation of the various components of the system 100.

Referring now to FIG. 9, a secondary operation 200 is shown. The secondary operation 200 is adapted to assembly the optical fibers 12 and the core 14. The secondary operation includes the take-up roll 142, a plurality of rolls 202 of optical fibers 12, a planetary strander 204 and a second take-up roll 206.

The core 14 disposed on the take-up roll 142 is paid out. As the core 14 is paid out, each of the rolls 202 of optical fibers 12 is rotated about its central axis 208. While the rolls 202 rotate about their central axes 208, the rolls 202 revolve about the core 14. The direction of revolution of the rolls about the core 14 is the same as the direction of the helical pattern of the grooves 46 of the core 14. The optical fibers 12 are inserted into the grooves 46 of the core 14 by the strander 204. After the core 14 exits the stander 204, the core 14 is stored on the secondary take-up roll 206.

Referring now to FIG. 10, a tertiary operation 300 is shown. The tertiary operation 300 is adapted to assembly the outer covering 18 to the core 14. The tertiary operation 300 includes a spool 302 having the outer covering 18 coiled about the spool 302. The secondary take-up roll 206 is rotated about its axis 304 to pay out the core 14 and optical fibers 12 disposed in the core 14. The spool 302 is rotated about its axis 306 to pay out the outer covering 18. As the spool 302 is rotated about its axis 306, the spool 302 is revolved about the core 14 to helically wrap the core 14 with the outer covering 18. A take-up roll 308 is rotates about its axis 310 to receive the optical fiber assembly 10.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

The invention claimed is:

1. An optical fiber assembly comprising:
    a core defining a plurality of grooves that is helically oriented along a length of the core;
    a plurality of optical fibers disposed in the plurality of grooves, the plurality of grooves being substantially empty except for the plurality of optical fibers so as to have an open configuration that allows for unimpeded gas flow radially through the grooves to the plurality of optical fibers; and
    an outer covering surrounding the core, the outer covering defining a plurality of pores.

2. The optical fiber assembly of claim 1, wherein the outer covering is made of a mesh material.

3. The optical fiber assembly of claim 2, wherein the outer covering is helically wrapped about the core.

4. The optical fiber assembly of claim 1, wherein the core includes a central portion defining a central passage.

5. The optical fiber assembly of claim 4, further comprising a strength member disposed in the central passage of the core.

6. The optical fiber assembly of claim 4, wherein the core includes a plurality of fins that extends outwardly from the central portion in a radial direction.

7. The optical fiber assembly of claim 6, wherein each of the fins includes a first projection that extends outwardly from a first surface of the fin and a second projection that extends outwardly from an oppositely disposed second surface of the fin.

8. The optical fiber assembly of claim 6, wherein the plurality of fins and the central portion of the core cooperatively define the plurality of grooves.

9. The optical fiber assembly of claim 1, wherein the core includes a nonuniform exterior surface against which the optical fibers are disposed.

10. The optical fiber assembly of claim 9, wherein the core is made from a material including foam.

11. The optical fiber assembly of claim 1, wherein the core includes a rounded exterior surface defined by a radius against which the optical fibers are disposed.

12. An optical fiber assembly comprising:
    a core including a central portion and a plurality of fins that extends radially outward from the central portion, the central portion defining a central passage, the central portion and the plurality of fins cooperatively defining a plurality of grooves that is helically oriented along a length of the core;
    a plurality of optical fibers disposed in the plurality of grooves, the plurality of grooves being substantially empty except for the plurality of optical fibers so as to have an open configuration that allows for unimpeded gas flow radially through the grooves to the plurality of optical fibers;
    a strength member disposed in the central passage of the core; and
    an outer covering surrounding the core, the outer covering being air permeable.

13. The optical fiber assembly of claim 12, wherein the outer covering is made of a mesh material.

14. The optical fiber assembly of claim 13, wherein the outer covering is helically wrapped about the core.

15. The optical fiber assembly of claim 12, wherein the outer covering defines a plurality of pores.

16. The optical fiber assembly of claim 12, wherein the core includes a nonuniform exterior surface against which the optical fibers are disposed.

17. The optical fiber assembly of claim 16, wherein the core is made from a material including foam.

18. The optical fiber assembly of claim 12, wherein the core includes a rounded exterior surface defined by a radius against which the optical fibers are disposed.

* * * * *